April 28, 1953

J. D. LINCOLN

2,636,540

HONEYCOMB CORE FABRICATING MACHINE

Filed Aug. 6, 1949

INVENTOR.
John D. Lincoln,
BY
Cromwell, Greist & Warden
Attys

April 28, 1953    J. D. LINCOLN    2,636,540
HONEYCOMB CORE FABRICATING MACHINE
Filed Aug. 6, 1949    6 Sheets-Sheet 2

INVENTOR.
John D. Lincoln,
BY
Cromwell, Greist & Warden
ATTYS

April 28, 1953 J. D. LINCOLN 2,636,540
HONEYCOMB CORE FABRICATING MACHINE
Filed Aug. 6, 1949 6 Sheets-Sheet 3

INVENTOR.
John D Lincoln,
BY
Cromwell, Greist + Warden
attys.

April 28, 1953  J. D. LINCOLN  2,636,540
HONEYCOMB CORE FABRICATING MACHINE
Filed Aug. 6, 1949  6 Sheets-Sheet 4

INVENTOR.
John D. Lincoln,
BY
Cromwell, Greist + Warden
Attys

April 28, 1953  J. D. LINCOLN  2,636,540
HONEYCOMB CORE FABRICATING MACHINE
Filed Aug. 6, 1949  6 Sheets-Sheet 6

INVENTOR.
John D. Lincoln,
BY
Cromwell, Greist & Warden
ATTYS

Patented Apr. 28, 1953

2,636,540

UNITED STATES PATENT OFFICE 2,636,540

HONEYCOMB CORE FABRICATING MACHINE

John D. Lincoln, Marion, Va.

Application August 6, 1949, Serial No. 109,035

11 Claims. (Cl. 154—1.8)

This invention relates to improvements in machines and methods for automatically producing from a strip or web of thin flexible sheet material a relatively thick, rigid honeycomb structure in continuous ribbon-like form.

It is a general object of the invention to provide a machine and method for progressively fabricating a strip or web of relatively thin sheet-like material, such as kraft paper, into a relatively thick rigid honeycomb structure which may be used for numerous purposes, for example, core structures for building panels, doors and similar elements.

It is a more specific object of the invention to provide a machine and method for fabricating honeycomb core structures wherein a continuously moving web of paper-like material is provided with longitudinal lines of adhesive in alternate transversely spaced relation on opposite sides, the web is successively folded or pleated in accordion fashion along longitudinally spaced transversely extending crease lines and simultaneously therewith formed into a relatively thick compacted ribbon which is characterized by transversely extending strips of uniform width, the adjacent strips being positioned in alternate face-to-face relation and connected along the top and bottom edges by alternate fold portions, the adhesive is set while the strips are held in compacted relation, the fold portions along the top and bottom surfaces of the ribbon are removed to form a honeycomb structure, the honeycomb structure is expanded, the expanded honeycomb is impregnated with a rigidifying material and finally the rigidifying material is set while the honeycomb is held in expanded condition.

It is a further object of the invention to provide a machine for forming honeycomb of the character described wherein there is provided a reciprocating pusher mechanism for intermittently engaging the web of material along longitudinally spaced transverse lines and successively forming therein double folds which are compacted to form a ribbon of material having a thickness of the depth of the folds.

It is a still further object of the invention to provide in a honeycomb forming machine a reciprocating pusher member which is arranged adjacent the end of a compacting chamber to intermittently engage the web of material in gripping relation along longitudinally spaced transverse lines and to form accordion folds in the web while at the same time inserting the successive folded portions of the web in the end of the compacting chamber.

It is another object of the invention to provide a honeycomb forming machine wherein a chamber is provided for receiving the folded material in compacted relation and a retaining means is provided at the receiving end of the chamber to retain the compacted material therein and prevent its withdrawal therefrom by retraction of the fold forming mechanism.

It is a further object of the invention to provide a honeycomb forming machine having a reciprocating mechanism for intermittently engaging the web of material along longitudinally spaced transverse lines to form accordion-like folds therein and a cooperating mechanism operable transversely of the path of travel of the web to initiate the folds in the web.

It is another object of the invention to provide a honeycomb forming machine having a reciprocating pusher mechanism for intermittently engaging the web of material along longitudinally spaced transverse lines to form accordion-like folds therein in combination with a blade-like mechanism which is reciprocated transversely of the path of travel of the web to initiate the folds in the web.

It is another object of the invention to provide a honeycomb forming machine having a reciprocating mechanism for intermittently engaging the web of material along longitudinally spaced transverse lines to form accordion-like folds therein in combination with a mechanism providing a blast of air along a line transversely of the path of travel of the web to initiate the folds in the web.

These and other objects of the invention will be apparent from a consideration of the methods and mechanisms which are described herein and illustrated by way of example in the accompanying drawings, wherein.

Referring to Figs. 1 to 6 of the drawings, there is illustrated an improved method for fabricating from a continuous web of relatively flexible material a honeycomb core structure in ribbon-like form and an improved machine for practicing the method, the steps of the method being best understood by reference to the operation of the machine.

Figure 1:
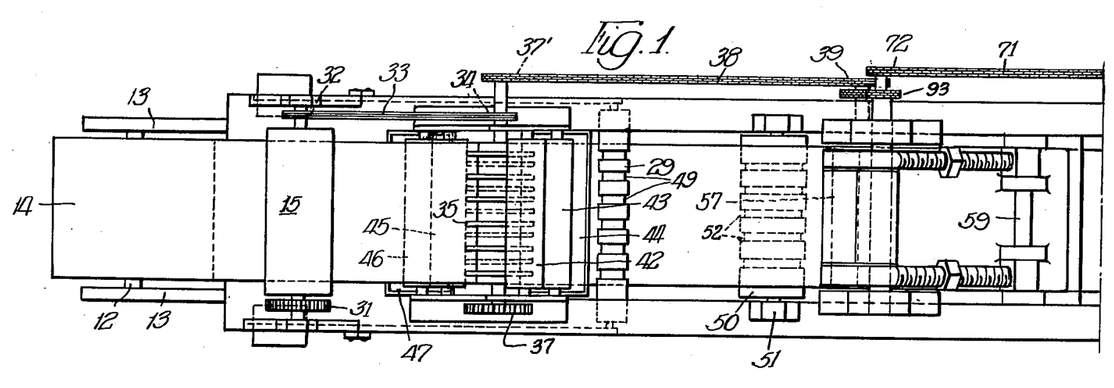
Figs. 1 and 2 constitute a plan view of a machine constructed in accordance with the principles of the invention.
Figure 2:
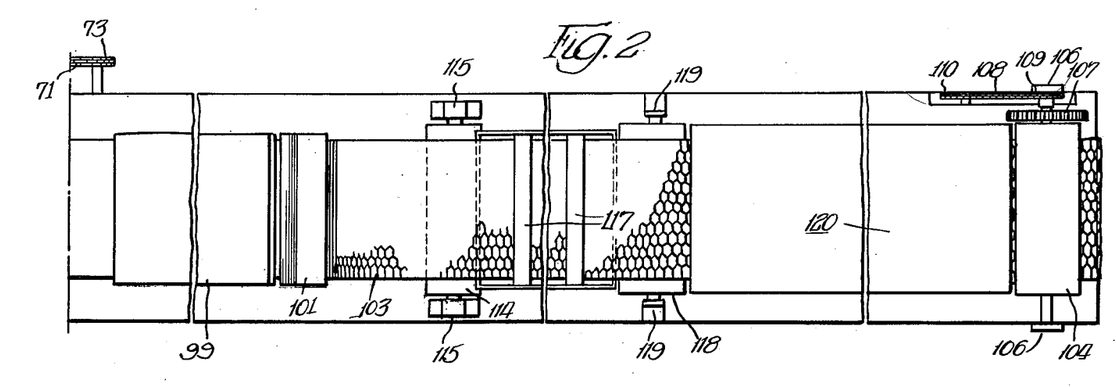
Figure 3:
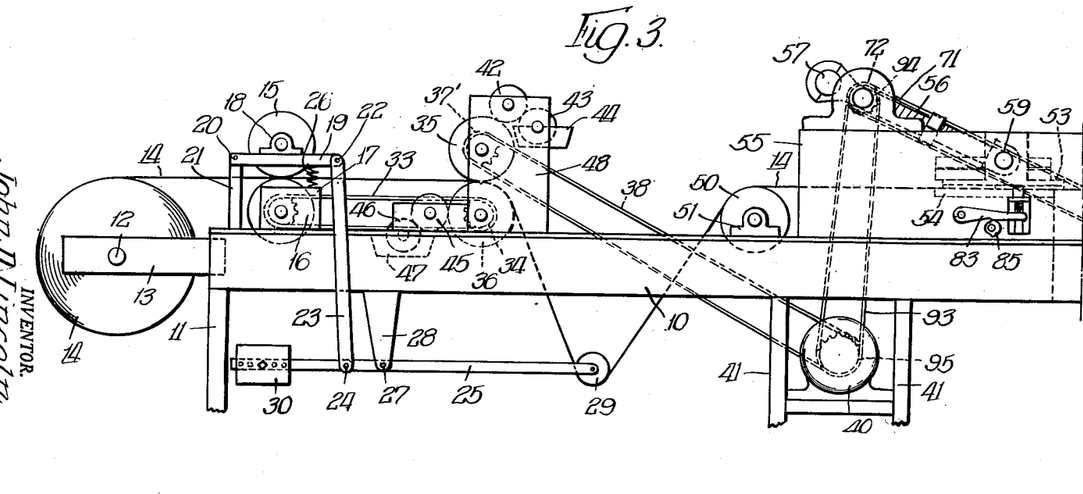
Figs. 3 and 4 constitute a side elevation of the machine.
Figure 4:
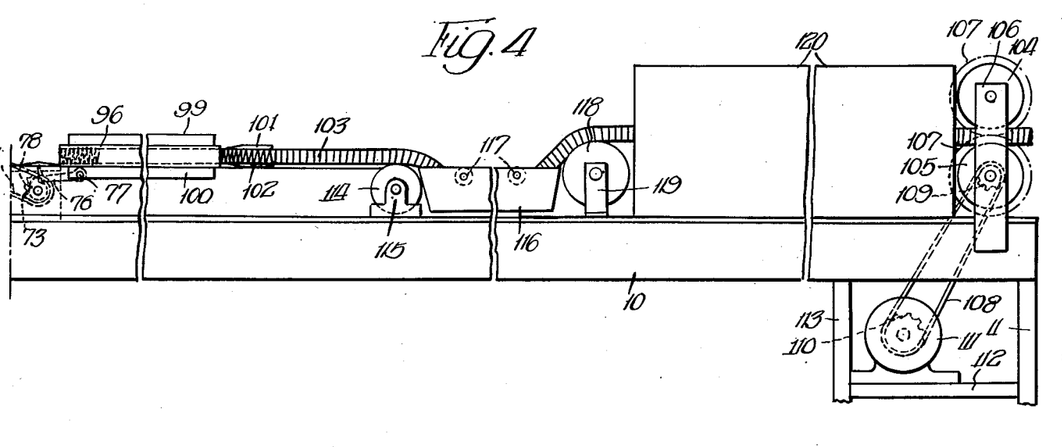

The illustrated machine comprises a relatively long generally rectangular base or frame 10 which is supported by depending end frames 11. At one end of the frame 10 a cross shaft 12 is journaled in side frame members 13 and supports a roll of kraft paper 14 from which the honeycomb is formed. The web of paper 14 is fed from the supply roll between a pair of upper and lower feed rollers 15 and 16. The lower feed roller 16 is journaled in upstanding side frame plates 17. The upper feed roller 15 is supported in bearings 18 which are mounted on longitudinally extending bars 19 above the side plates 17. One end of each bar 19 is pivoted at 20 to a post 21 projecting upwardly near the end of the frame 10. At the other end each bar 19 is pivoted at 22 to the upper end of a vertically extending link 23 which is pivoted at its lower end 24 to a generally horizontally extending bar 25. A compression spring 26 extends between the upper edge of the side frame plate 17 and the bar member 19 above the same, the spring 26 tending to separate the feed rollers 15 and 16 and stop the feed of the web 14.

The bottom bar 25 forms a part of a feed control and tensioning device for the web 14. It is pivoted intermediate its ends at 27 to a bracket 28 depending from the frame 10. A take-up roller 29 is rotatably mounted between the forward ends of the bars 25 and engages the upper surface of the web 14. Adjustable counterweights 30 are provided at the rearward ends of the bars 25.

The feed rollers 15 and 16 are connected at one end by means of interengaging gears 31 and the lower feed roller 16 is provided with a sprocket 32 at its other end which is connected by a chain 33 with a sprocket 34 on the one end of the lower one of a pair of upper and lower glue applying or striping rolls 35 and 36. The glue rolls 35 and 36 are connected by interengaging gears 37 at one end. The upper glue roll 35 is provided with a sprocket 37' which is connected by a drive chain 38 with a drive sprocket 39 on a motor 40 which is supported between intermediate frame members 41 depending from the side frame 10. The glue applying rolls 35 and 36 are provided with interrupted surfaces so that each roll applies a plurality of transversely spaced horizontally extending lines of glue on the web 14. The lower roll 36 applies the glue lines to the bottom of the web 14 while the upper roll 35 applies the glue lines to the top of the web 14. The spacing arrangement of the stripe applying elements on the rolls 35 and 36 is such that the glue lines are applied in alternate spaced relation on opposite sides of the web 14. The distance between the glue lines depends upon the desired size of the honeycomb cells.

The upper glue roll 35 is supplied with glue from a supply roller 42 which engages the fountain roller 43 in a supply fountain 44. The lower glue roll 36 is supplied with glue from a supply roller 45 which engages a fountain roller 46 operating in lower fountain 47. The rollers 42, 43, and 45, 46 are journaled in upstanding side frame plates 48 which also support the fountains 44 and 47. The glue rollers 42 and 43 may be connected by a chain drive with the upper glue applying roller 35, and the glue rollers 45 and 46 may be connected by a chain drive with the lower glue applying roller 36.

The tension applying or take-up roller 29 is grooved as shown at 49 to accommodate the glue lines on the top surface of the web 14.

The web 14 passes from the take-up roller 29 over an idler roller 50 which is supported in side bearings 51 on the top of the frame 10 and which is grooved as indicated at 52 to accommodate the glue lines on the bottom surface of the web 14.

Figure 5:
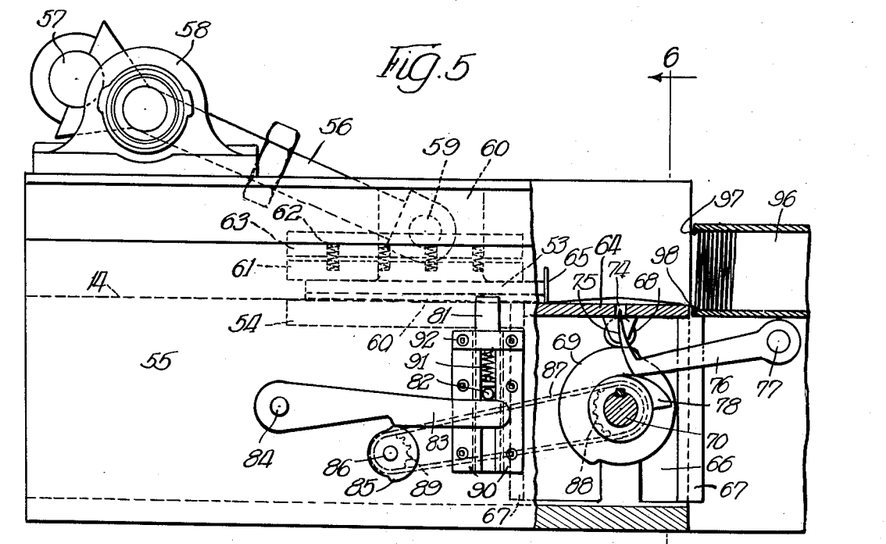
Fig. 5 is an elevation of the fold forming portion of the machine to an enlarged scale and with portions shown in section.
Figure 6:
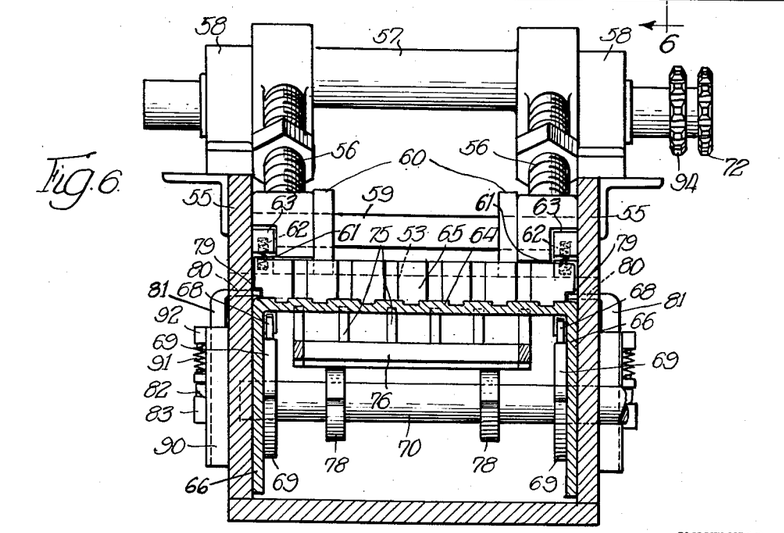
Fig. 6 is a section taken generally on the line 6—6 of Fig. 5.
Figure 7:
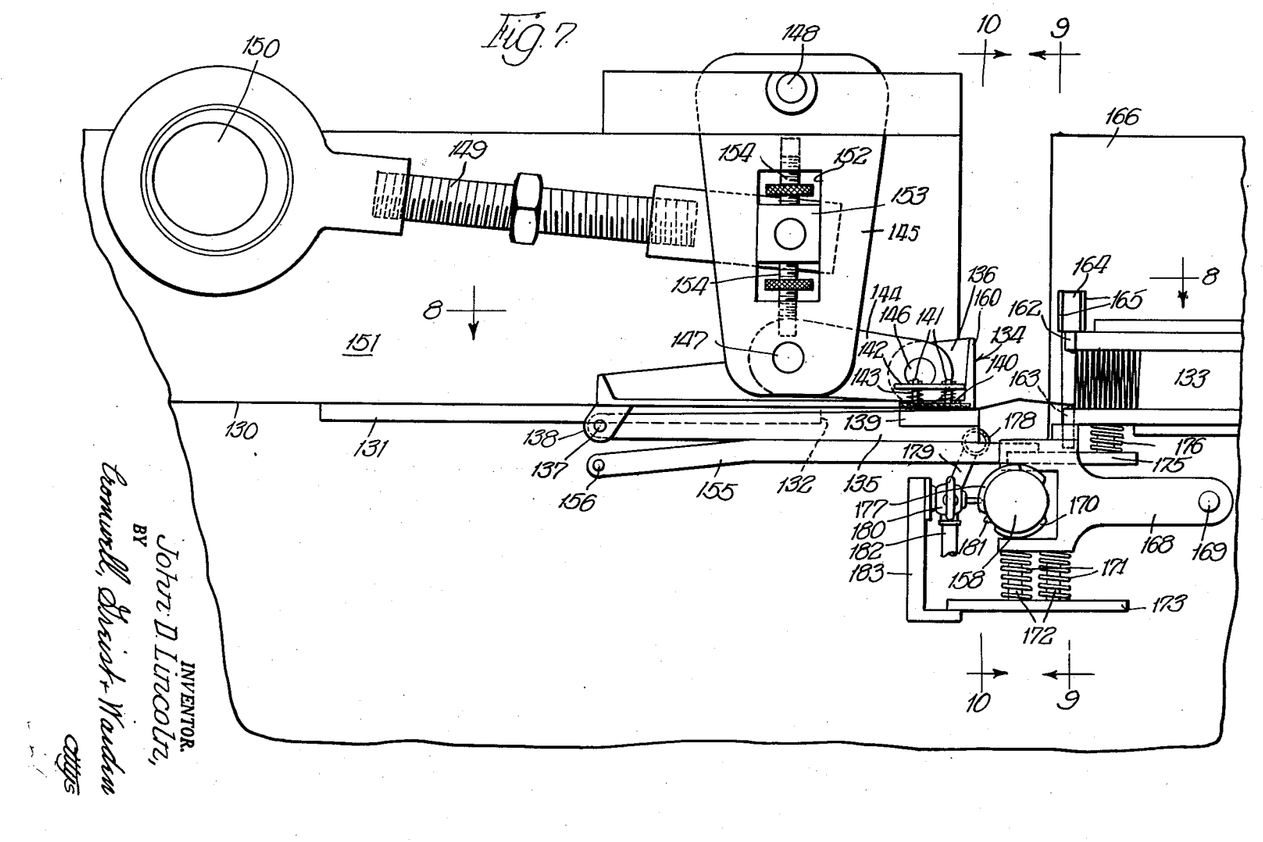
Fig. 7 is a side elevation of a modified fold forming mechanism.
Figure 8:
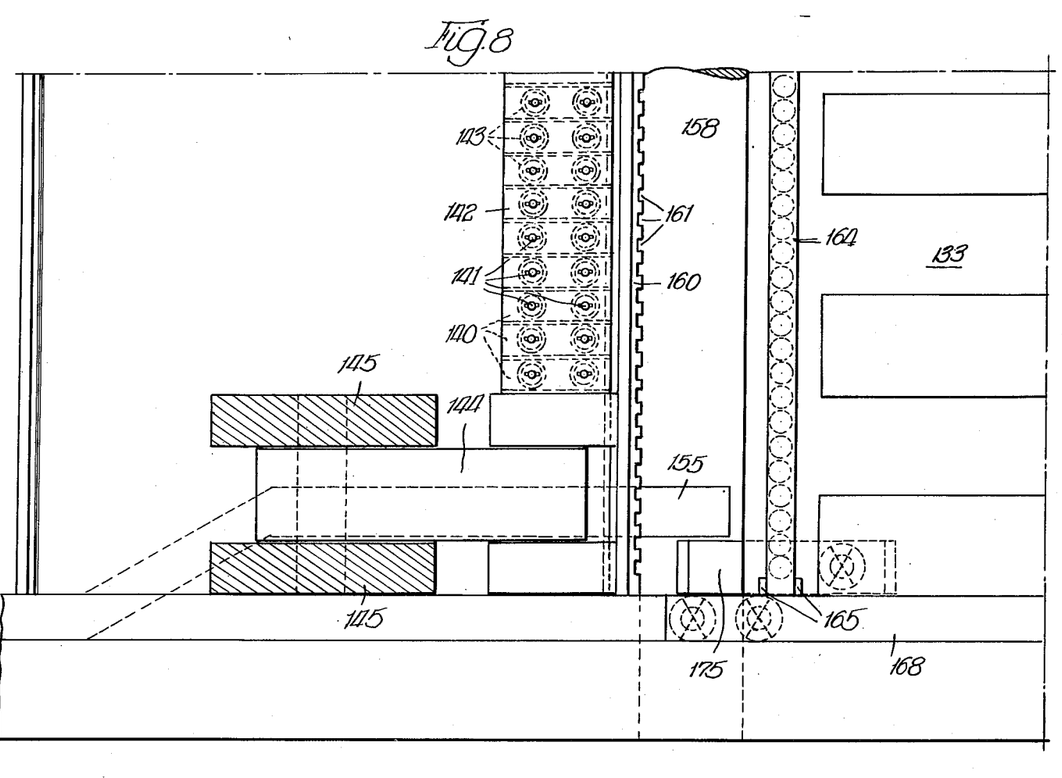
Fig. 8 is a half section taken generally on the line 8—8 of Fig. 7 to an enlarged scale.
Figure 9:
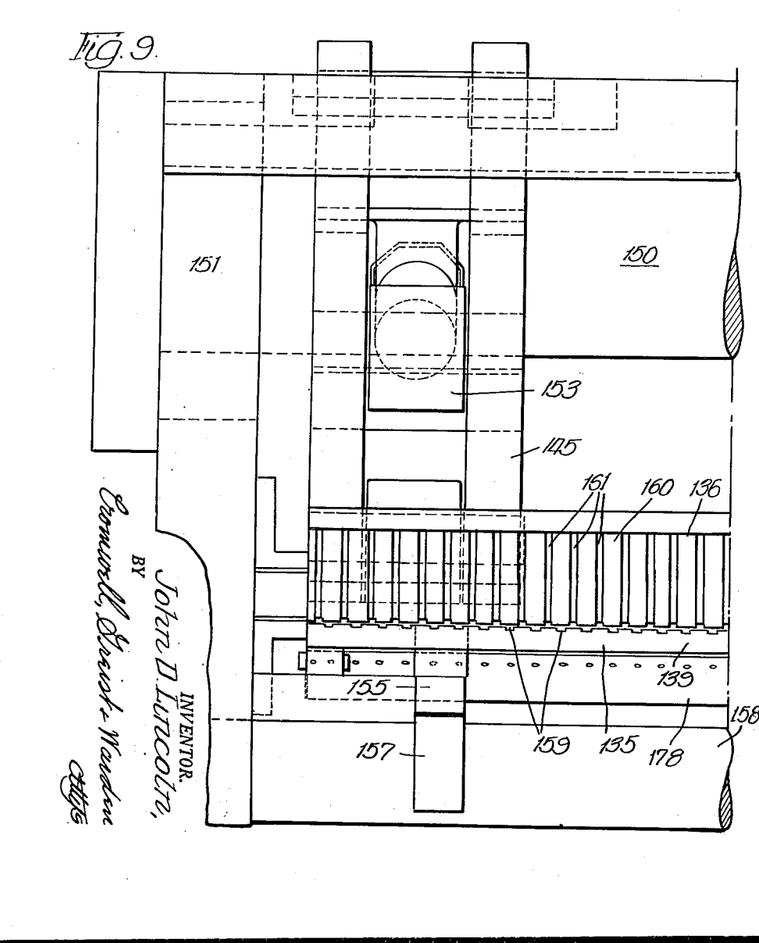
Fig. 9 is a half section taken generally on the line 9—9 of Fig. 7 to an enlarged scale.
Figure 10:
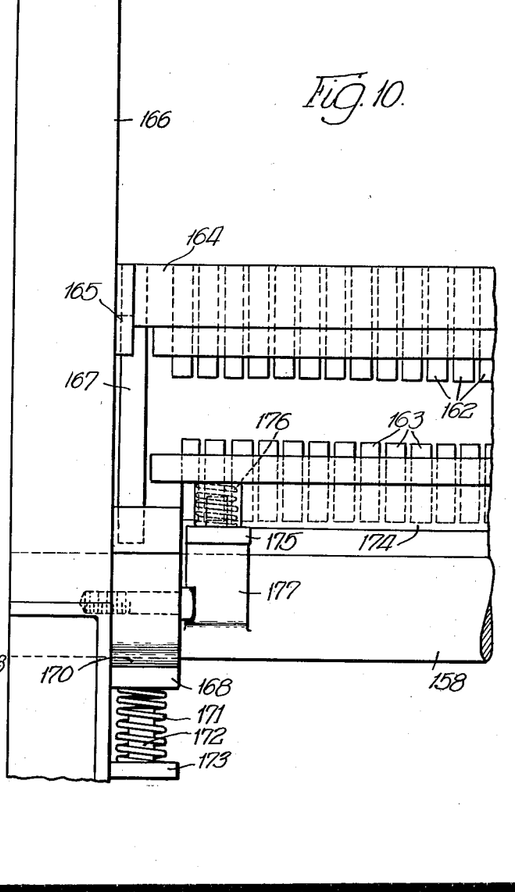
Fig. 10 is a half section taken generally on the line 10—10 of Fig. 7 to an enlarged scale.

From the idler roller 50 the adhesively striped web 14 passes to a mechanism for placing in the web a continuous series of double folds which mechanism is illustrated in Figs. 5 and 6, particularly. The mechanism comprises a longitudinal reciprocating upper pusher plate 53 and a bottom bed plate or table 54 having a vertically reciprocating forward portion, both of which are mounted between upwardly extending side frame plates 55.

The upper pusher plate 53 is reciprocated longitudinally of the machine by adjustable arms 56 which are connected at one end to an eccentric 57. The eccentric 57 is journaled in side bearing members 58 on the top of the supporting plates 55. The other ends of the arms 56 are pivotally connected at 59 to upstanding bearing members 60 on the upper face of the pusher plate 53. The plate 53 reciprocates in guideways formed by the fixed portion of table 54 and upper guide rails 61 which are urged downwardly by the springs 62 mounted on pins in aligned sockets in rails 61 and upper fixed rails 63. At the forward end, the pusher plate 53 is provided with a transversely arranged knife edge blade member 65 which is adapted to rest on the upper surface of the forward or movable plate portion 64 of the table 54. The upper plate 53, table 54, including movable portion 64, and blade 65 are grooved or slotted to clear the glue lines on the web 14.

The movable lower plate portion 64 is provided with depending side flanges 66 which are guided for vertical movement by side guide rails 67 on the inside of the supporting plates 55. Cam members 68 on the depending side flanges 66 are engaged by cams 69 mounted on a transverse shaft 70 journaled in the side plates 55 and driven from the eccentric drive shaft 57 by the means of a chain 71 and sprockets 72, 73 on the shafts 57 and 70, respectively.

The movable bottom plate portion 64 is provided with an aperture at 74 in which a plurality of fingers 75 reciprocates. The fingers 75 are mounted on a frame having side arms 76 pivoted at 77 and are reciprocated by cams 78 on the cam shaft 70. The fingers 75 move into engagement with the web 14 through the slot 74 to initiate the formation of the successive folds.

A paper hold-down member 79 is arranged on each side of the machine extending inwardly through a slot 80 in the side plates 55 and having a depending operating arm 81 provided with a pin 82 which is engaged by a cam arm 83 pivoted to the side plate 55 at 84 and operated by a cam member 85 on a cam shaft 86 which is driven by a chain 87 and sprockets 88, 89 from the cam shaft 70. The depending arm 81 is guided by spaced side guide plates 90 and is urged in a downward direction by a spring 91 which engages the pin 82 and a crossbar 92 at the upper end of the guides 90.

The eccentric shaft 57 which drives the cam shafts 70 and 86 is driven by chain 93 and sprockets 94, 95 on the cam shaft 57 and the drive shaft of motor 40, respectively.

The web of material 14 rests on the top surface of table 54 and extends over the same to a compacting chamber 96 beyond the transverse aperture 74 a distance equal to the depth of the honeycomb material being formed. The upper pusher plate 53 is reciprocated a distance in the longitudinal direction equal to approximately twice the depth of the honeycomb formation. The bottom plate portion 64 is raised by the cams 69 a sufficient distance to bring the blade edge 65 into frictional engagement with the web 14. With the lower plate portion 64 held in its uppermost position the pusher plate 53 is advanced across the aperture 74 to the end of the compacting chamber 96 carrying with it a length of the web material 14 which is equal to twice the depth of the desired honeycomb and double folding the material while at the same time inserting it in the chamber 96. The central or upper fold in the length of material which is carried forward by the blade 65 is started by upward movement of the fingers 75 which is caused by operation of the cam 78. The fingers 75 are withdrawn to clear the blade 65 as it passes forwardly over the aperture 74. Return movement or retraction of the blade 65 occurs when the bottom plate 64 is in lowered position. In this position of the bottom plate 64 the web 14 is out of contact with the blade 65 and is held in non-retracted relation to the plate 54 by the hold-down fingers 79 which are operated by the cams 85 and cam arms 83 in timed relation to the movement of the lower plate 64 and the upper pusher plate 53.

At the top and bottom edges of the entrance to the compacting chamber 96 inwardly extending ledge formations or catches 97 and 98 are provided to retain the compacted material in the chamber 96 and prevent its withdrawal upon return of the pusher blade 65 when the latter is moved into retracted position. The upper and lower walls of chamber 96 and the ledge formations 97, 98 may be grooved to clear the glue lines on the top and bottom edges of the folded material.

The compacting chamber 96 is provided with heaters 99 and 100 for drying the adhesive while the compacting material moves through the chamber 96 at a relatively slow rate. The heaters 99 and 100 may be arranged in the walls of the chamber 96 or outside of the same. The required heat may be provided electrically or in any other conventional manner.

A pair of knives 101 and 102 are provided for trimming the top and bottom edges of the compacted material. Knives 101 and 102 may be arranged at the end of chamber 96 as shown or positioned in recesses in the top and bottom plates of the chamber 96. The knives 101 and 102 are arranged with their cutting edges in opposed relation to the movement of the material and may be adjusted to trim as much as desired from the top and bottom of the compacted material so that the material is free to be expanded in the honeycomb form as indicated at 103. The knives 101 and 102 may be vibrated horizontally across the path of movement of the compacted material by suitable vibrating mechanism, if desired.

As the honeycomb 103 moves beyond the knives 101 and 102 it is opened up into spread out formation by increasing the rate of movement of the same or by applying a pull on the same. The increased movement of the honeycomb 103 may be accomplished by a pair of pull or feed rollers 104 and 105 arranged at the discharge end of the machine and journaled between upstanding side plate members 106. The pull rollers 104 and 105 are positioned in spaced relation above and below the honeycomb material and are connected to each other by gears 107. The lower roller 105 is driven by a chain 108 and sprockets 109, 110 from the motor 111 which is supported on a platform 112 extending between the end frame 11 and an intermediate frame 113 at the end of the machine.

As the honeycomb material 103 leaves the compacting chamber 96 or the trimming knives 101, 102 it is opened out and fed over an idler roller 114 which is journaled in side bearings 115 mounted on the frame 10. From the idler roller 114 the material is fed into an impregnating tank or pan 116 which contains a supply of heat hardenable material such as a thermosetting resin or the like. The tank 116 is supported on the frame 10 and is provided with spaced rollers 117 beneath which the honeycomb 103 passes to insure immersion of the same in the rigidifying bath. The impregnated material then passes over an idler roller 118 which is journaled in side plates 119 extending upwardly of the frame 10, and continues into a heating oven 120 which is supported on the frame 10. The oven 120 may be kept at the required temperature by any conventional means and is of sufficient length to dry or set the resin in the impregnated honeycomb and rigidify the same.

As the honeycomb material 103 is fed over the idler roller 114 and into the dipping tank 116 where it is impregnated with the rigidifying material, it is in a limp state and readily opens out due to the pull exercised on the material by the pull rollers 104 and 105 at the end of the machine. The completely formed and rigidified material is discharged from the machine by the rollers 104 and 105 at a speed which is substantially greater than the speed of the material as it leaves the compacting chamber 96 or the trimming knives 101, 102.

The width of the completely formed material depends, of course, upon the width of paper which is used and the degree to which the honeycomb is stretched before it enters the drying chamber. The material is produced in a continuous ribbon and may be cut to any desired length.

A modified form of mechanism for providing the successive double folds in the material is shown in Figs. 7 to 10. In this form of the mechanism (Fig. 7) the paper web 130 travels over a fixed or stationary bed or plate 131 which is supported on the frame of the machine at the proper level relative to the glue applying mechanism. The forward end 132 of bed plate 131 is spaced a substantial distance from the end of the compacting chamber indicated at 133 and a reciprocating gripper mechanism 134 is operated in the space between the end 132 of the bed 131 and the compacting chamber 133.

The reciprocating gripper mechanism 134 comprises a bottom gripper jaw 135 and a top gripper jaw 136. The bottom gripper jaw 135 is pivoted at 137 to a bracket 138 depending from the trailing end of the gripper jaw 136. The bottom jaw 135 may be provided with a rubber insert 139 at its forward end for engagement by the web material 130. The top gripper jaw 136 is provided with a series of teeth or serrated clamping plates 140 which are suspended in transversely spaced relation on pins 141. The pins 141 are supported for limited vertical sliding movement on a cross bar 142 and urged in the downward direction by springs 143.

The top gripper jaw 136 is connected by links 144 with reciprocating arms 145 which are pivoted to the gripper jaw at 146 and to the lower ends of the arms 145 at 147. The arms 145 are pivoted at 148 to fixed portions of the machine and are adapted to swing in a direction lengthwise of the machine. Each arm 145 is connected by an adjustable link 149 to an eccentric shaft 150 which extends transversely of the machine and which is journaled in the side frame plates 151. The arms 145 are provided with vertical slots 152 and links 149 are pivotally connected to vertically slidable blocks 153. The position of the blocks 153 in the slots 152 is controlled by manually operated screws 154 to vary the stroke of the arms 145.

The lower jaw 135 of the gripper mechanism 134 is controlled by cam members 155 which are pivoted at one end to the frame of the machine at 156 and at the other end rest on rotatable cams 157 which are mounted on a cam shaft 158 extending transversely of the machine. The cam shaft 158 is driven from the operating power mechanism. The cam members 155 are adapted to be reciprocated vertically by rotation of the cams 157 to engage and disengage the jaws 135 and 136 in gripping relation with the web 130.

The length of stroke or movement of the gripper jaw members 135 and 136 is adjusted to approximately twice the depth desired for the compacted material in the chamber 133 so that the grippers move a length of web material 130 sufficient to form a double fold into the compacting chamber 133 at each stroke. The lower gripper jaw 135 and the rubber insert 139 are grooved as indicated at 159 (Fig. 9) to clear the glue lines on the bottom surface of the web 130. The upper gripper jaw 136 is provided with a vertical forward face or wall plate 160 for engaging that portion of the length of the material being folded which constitutes the second fold. The bottom surface of gripper jaw 136 and the front surface of the vertical plate 160 are provided with grooves indicated at 161 (Fig. 9) for clearing the glue lines on the top surface of the web 130. The grooves 159 and 161 are staggered to correspond with the position of the glue lines on opposite sides of the web 130.

The chamber 133 is provided at its entrance with mechanism to retain the material in the chamber and prevent its withdrawal upon retraction of the gripper jaws 135 and 136. The retainer mechanism comprises upper and lower rows or stock retainer pins 162 and 163. The upper stack retainer pins 162 are secured to a crossbar 164 which is movable in guideways 165 in the side frame members 166. The supporting crossbar 164 is provided at opposite ends with depending vertical members 167 extending to cam arms 168 which are pivoted at 169 to the side frame members 166 and which are operated by cams 170 on the cam shaft 158. The cam arms 168 are forked at the ends and straddle shaft 158 with lower forked portions engaging compression springs 171 which are mounted on pins 172 extending upwardly from the fixed plates 173, the latter being secured to the frame of the machine. Springs 171 insure positive retraction of the retainer pins 162. The lower stack retainer pins 163 are connected to a crossbar 174 which is secured at its opposite ends to cam arms 175. The cam arms 175 are urged downwardly by compression springs 176 which engage between one end of the cam arms 175 and the bottom of the compacting chamber 133 or other fixed portion of the machine frame. The cam arms 175 engage at their other ends cams 177 on the cam shaft 158. The retainer pins 162 and 163 are movable by the cams 170 and 177 in timed relation to the gripper jaws to permit the folded material to be compacted in the chamber 133 and retained therein upon retraction of the gripper jaws 135 and 136.

The central fold in the web of material 130 which is folded upon each stroke of the grippers is initiated by a blast of air which is supplied by a transversely extending perforated tubular member or pipe 178 which is connected by a conduit 179 to a valve 180 controlled by a cam 181 on the cam shaft 158 and supplied with air from a supply pipe 182. The air mechanism is supported in fixed relation on brackets 183 secured to the frame of the machine.

The modified mechanism operates in the same manner as the previously described fold forming mechanism. The gripper jaws 135 and 136 engage the web of material 130 on opposite sides and carry a predetermined length of the material toward the compacting chamber 133 to double fold the same and insert it in the compacting chamber 133. The intermediate or central fold is initiated by air from the transverse pipe 178 which is supplied in timed relation to the reciprocating movement of the gripper jaws 135 and 136. As the gripper jaws 135 and 136 begin their retracting movement the cams 157 permit disengagement of the jaws 135 and 136 with the paper web 130 so that the paper is not retracted by movement of the gripper jaws.

While specific method steps and detailed mechanisms have been particularly described in order to fully illustrate applicant's invention, it will be understood that variations in the method steps and in the mechanism for carrying out the same are contemplated within the spirit of the invention.

I claim:

1. A machine for producing from a web of thin flexible material a relatively thick honeycomb structure in continuous ribbon-like form which includes in combination means for continuously feeding the web of material, means for applying longitudinal lines of adhesive in staggered transversely spaced relation on opposite faces of the material, a supporting surface over which the material is adapted to be moved, reciprocating means for intermittently gripping the web along a transversely extending line and moving a predetermined length of the material forwardly along said supporting surface to form a double fold in the material, a drying chamber aligned with said supporting surface for receiving successively folded lengths of the material as it is moved forwardly by said reciprocating means and for drying the adhesive whereby to connect the adjacent faces of the folded material at transversely spaced points along the adhesive lines, spaced trimming knives on opposite sides of the path of movement of the folded material for removing the top and bottom edges of said folded material, and means for opening up the same to form a honeycomb structure of substantially uniform thickness.

2. Apparatus for producing a relatively thick core structure which core structure is characterized by a plurality of strips of relatively thin material arranged in edgewise face-to-face interconnected honeycomb forming relation, said apparatus comprising means for feeding a web of the strip forming material continuously, means for applying longitudinal lines of glue in alternate spaced relation on opposite faces of the material, a supporting table over which the material is adapted to be moved, a pusher plate reciprocable along the surface of said table for a predetermined distance, a drying chamber aligned with said table having an entrance at the end of the path of movement of said pusher plate, means for reciprocating said pusher plate intermittently to grip said material and move successive predetermined lengths thereof into said chamber, said lengths being folded and the strips defined by the folds being brought into face-to-face compacted relation in said chamber, means on opposite sides of said chamber for removing the top and bottom surfaces of the compacted material to disconnect the strips at their top and bottom edges, means to expand the resulting face-to-face interconnected strips into a honeycomb structure, and means for providing the honeycomb structure with a rigidifying substance.

3. Apparatus as recited in claim 2 and a reciprocating member movable laterally of the path of movement of said pusher plate to engage said material and assist in forming the folds in the successive lengths thereof.

4. Apparatus as recited in claim 2 and a perforated pipe arranged at one side of the material for directing a blast of air against the successive lengths of said material to assist in forming the folds therein.

5. A machine for producing from a web of thin flexible material a relatively thick honeycomb structure in continuous ribbon-like form which includes in combination means for continuously feeding the web of material, means for applying longitudinal lines of adhesive in staggered transversely spaced relation on opposite faces of the material, reciprocating gripper means for intermittently gripping the material on opposite faces and along successive transversely extending longitudinally spaced lines and for moving predetermined lengths thereof forwardly to double fold each length and bring the folded portions in face-to-face relation, a drying chamber adjacent the end of the path of movement of said gripper means for receiving the successive folded portions in compacted relation and for holding the same in compacted relation until the adhesive is set to thereby connect the adjacent faces thereof at transversely spaced points along the adhesive lines, means for removing the top and bottom edges of the folded portions of the material, and means for opening up the material to form a honeycomb structure of substantially uniform thickness.

6. A machine as recited in claim 5 and said drying chamber having retainer formations at the receiving end thereof for preventing withdrawal of the folded material upon retraction of said gripper means.

7. A machine as recited in claim 5 and said drying chamber having movable retainer elements at the top and bottom sides of the receiving end thereof for retaining the folded material in the chamber during retracting movement of said gripper means.

8. A machine for producing from a web of thin flexible material a relatively thick honeycomb structure in continuous ribbon-like form which includes in combination means for continuously feeding the web of material, means for applying longitudinal lines of adhesive in staggered transversely spaced relation on opposite faces of the material, a plate member having a supporting surface over which the material is adapted to move, reciprocating means for intermittently engaging said material along a transverse line and for moving successive predetermined lengths thereof forwardly over the supporting surface of said plate member whereby to form therein successive double folds, a heated chamber aligned with said plate member for receiving the folded material and for holding the same in compacted relation while allowing the adhesive to set to thereby connect the adjacent faces of the folds thereof at transversely spaced points along the adhesive lines, means for removing the top and bottom edges of the material, and means for opening up the material to form a honeycomb structure of substantially uniform thickness.

9. A machine as recited in claim 5 wherein the means for removing the top and bottom edges of said material comprises knives having cutting edges adjustably positioned adjacent the upper and lower walls of said heated chamber.

10. A machine as recited in claim 5 wherein said gripper means comprises a pair of cooperating upper and lower gripper jaws and cam controlled means operative in timed relation to the forward movement of said gripper means for opening and closing said gripper jaws to grip the material therebetween.

11. A machine as recited in claim 8 wherein said reciprocating means comprises a gripper member for grasping the web of material and wherein said plate member comprises a portion movable in a direction transverse to the movement of the material in timed relation to the movement of said gripper member for cooperation with said gripper member to advance the successive lengths of material over the surface of said plate member.

JOHN D. LINCOLN.

References Cited in the file of this patent

UNITED STATES PATENTS

| Number | Name | Date |
| --- | --- | --- |
| 1,924,472 | Thomson | Aug. 29, 1933 |
| 2,366,130 | Slavek | Dec. 26, 1944 |
| 2,369,006 | Banks | Feb. 6, 1945 |
| 2,368,445 | Brandt | Jan. 30, 1945 |
| 2,428,979 | May | Oct. 14, 1947 |